(12) United States Patent
Kudelski et al.

(10) Patent No.: US 8,036,387 B2
(45) Date of Patent: Oct. 11, 2011

(54) METHOD FOR THE TRANSMISSION OF MANAGEMENT DATA

(75) Inventors: Henri Kudelski, Chexbres (CH); Joël Conus, Echallens (CH)

(73) Assignee: Nagra Vision S.A., Cheseaux-Sur-Lausanne (CH)

( * ) Notice: Subject to any disclaimer, the term of this patent is extended or adjusted under 35 U.S.C. 154(b) by 1227 days.

(21) Appl. No.: 11/705,051

(22) Filed: Feb. 12, 2007

(65) Prior Publication Data

US 2007/0195950 A1  Aug. 23, 2007

(30) Foreign Application Priority Data

Feb. 23, 2006 (EP) .................................. 06110338

(51) Int. Cl.
 *H04L 9/08* (2006.01)
 *H04L 9/32* (2006.01)
(52) U.S. Cl. ........................ 380/278; 713/172
(58) Field of Classification Search ............. 380/30, 380/201, 239, 241, 279, 284; 713/172, 193, 713/194; 726/26
See application file for complete search history.

(56) References Cited

U.S. PATENT DOCUMENTS

| | | | |
|---|---|---|---|
| 6,118,873 A | 9/2000 | Lotspiech | |
| 6,516,412 B2 * | 2/2003 | Wasilewski et al. | 713/168 |
| 6,714,650 B1 * | 3/2004 | Maillard et al. | 380/231 |
| 6,725,459 B2 * | 4/2004 | Bacon | 725/31 |
| 7,567,674 B2 * | 7/2009 | Nishimoto et al. | 380/281 |
| 7,660,419 B1 * | 2/2010 | Ho | 380/270 |
| 2002/0090090 A1 * | 7/2002 | Van Rijnsoever et al. | 380/279 |
| 2002/0172366 A1 * | 11/2002 | Peterka et al. | 380/277 |
| 2003/0169879 A1 * | 9/2003 | Akins et al. | 380/241 |
| 2003/0188164 A1 * | 10/2003 | Okimoto et al. | 713/172 |
| 2003/0200548 A1 * | 10/2003 | Baran et al. | 725/90 |
| 2004/0010349 A1 * | 1/2004 | Perez et al. | 700/287 |
| 2004/0052377 A1 | 3/2004 | Mattox et al. | |
| 2004/0068541 A1 * | 4/2004 | Bayassi et al. | 709/204 |
| 2004/0120529 A1 * | 6/2004 | Zhang et al. | 380/278 |
| 2005/0084106 A1 * | 4/2005 | Venema et al. | 380/239 |
| 2005/0141713 A1 * | 6/2005 | Genevois | 380/239 |
| 2005/0201559 A1 * | 9/2005 | Van Der Heijden | 380/239 |
| 2005/0236475 A1 * | 10/2005 | Becker et al. | 235/382.5 |
| 2005/0249350 A1 * | 11/2005 | Kahn et al. | 380/239 |

FOREIGN PATENT DOCUMENTS

| | | |
|---|---|---|
| EP | 1067720 A | 1/2001 |
| EP | 1301037 A | 4/2003 |
| WO | WO 02/062054 A2 | 8/2002 |

OTHER PUBLICATIONS

European Search Report.

* cited by examiner

*Primary Examiner* — Nathan Flynn
*Assistant Examiner* — Abdullah Almamun
(74) *Attorney, Agent, or Firm* — Harness, Dickey & Pierce, P.L.C.

(57) ABSTRACT

This invention relates to a method for the transmission of management data to at least one multimedia unit or a group of multimedia units. This method is characterized in that said management data is sent in the form of at least one authorization message encrypted by means of at least one synchronization key (SK), the sending of said at least one authorization message being repeated cyclically and intended for said multimedia unit or said group of multimedia units, and in that the synchronization key is modified at least during each cycle.

19 Claims, 2 Drawing Sheets

| EMM$_{sync}$ | | | | |
|---|---|---|---|---|
| (SK1)$_{GK}$ | [(EMM1)$_{GK}$]$_{SK1}$ | [(EMM2)$_{GK}$]$_{SK1}$ | [(EMM3)$_{GK}$]$_{SK1}$ | (SK2)$_{GK}$ | [(EMM1)$_{GK}$]$_{SK2}$ |

| (cw1;cw2)$_{TK}$ | (cw2;cw3)$_{TK}$ | (cw3;cw4)$_{TK}$ | (cw4;cw5)$_{TK}$ |
|---|---|---|---|

FIG. 1

| (SK1*)$_{GK}$ | [(EMM1)$_{GK}$]$_{SK1}$ | [(EMM2)$_{GK}$]$_{SK1}$ | [(EMM3)$_{GK}$]$_{SK1}$ | (SK2*)$_{GK}$ | [(EMM1)$_{GK}$]$_{SK2}$ |
|---|---|---|---|---|---|

| (SK1**)$_{TK}$ | (cw1;cw2)$_{TK}$ | (cw2;cw3)$_{TK}$ | (cw3;cw4)$_{TK}$ | (SK2**)$_{TK}$ | (cw4;cw5)$_{TK}$ |
|---|---|---|---|---|---|

FIG. 2

| (SK1)$_{GK}$ | (SK2)$_{GK}$ |
|---|---|

| (EMM1)$_{SK1}$ | (EMM2)$_{SK1}$ | (EMM3)$_{SK1}$ | (EMM1)$_{SK2}$ |
|---|---|---|---|

| (cw1;cw2)$_{TK}$ | (cw2;cw3)$_{TK}$ | (cw3;cw4)$_{TK}$ | (cw4;cw5)$_{TK}$ |
|---|---|---|---|

FIG. 3

METHOD FOR THE TRANSMISSION OF MANAGEMENT DATA

PRIORITY STATEMENT

This application claims benefit of priority under 35 U.S.C. §119 from European Patent Application No. 06110338.8 filed on Feb. 23, 2006, in the European Patent Office, the disclosure of which is incorporated herein by reference in its entirety.

TECHNICAL FIELD

The present invention relates to the field of access to conditional access data, in particular in the field of Pay-TV. More precisely, it concerns a method for the transmission of management data to at least one multimedia unit, the decryption of said data being conditioned on rights stored in the multimedia unit.

BACKGROUND ART

As is well known, in order to be able to access encrypted data such as information, software, games, or to visualise a Pay-TV event, such as a film, a sports event or a game in particular, several streams are broadcast to a set of multimedia units made up of a decoder and of a security module. These streams are, in particular, on one hand the file of the event in the form of an encrypted data stream and on the other hand, a stream of control messages ECM allowing the decryption of the data stream. The content of the data stream is encrypted by "control words" (cw) that are regularly renewed. The second stream is called the ECM (Entitlement Control Message) stream and can be formed in particular in two different ways. According to a first method, the control words are encrypted by a key, called a transmission key TK, which generally pertains to the transmission system between the management centre and a security module associated with the receiver/decoder. The control word cw is obtained by decrypting the control messages ECM by means of the transmission key TK.

According to a second method, the ECM stream does not directly contain the encrypted control words, but rather contains information allowing the determination of the control words. This determination of the control words can be carried out by means of different operations, in particular by decryption, this decryption being able to provide the control word directly, which corresponds to the first method described above, but the decryption can also obtain a piece of data which contains the control word, the latter still having to be extracted from the data. In particular, the data can contain the control word as well as a value associated with the content to be broadcast, and in particular the access conditions to this content. Another operation allowing the determination of the control word can use for example a one-way hashing function of this piece of information in particular.

The security operations are generally carried out in the security module associated with the decoder. This type of security module can be produced in particular according to four different forms. One of these is a microprocessor card, a smart card, or more generally an electronic module (taking the form of a key, of a badge, . . . ). This type of module is generally removable and can be connected to the decoder. The form with electric contacts is the most widely used, but does not exclude a connection without contact, for example of the ISO 14443 type.

A second known form is that of an integrated circuit box, generally placed definitively and irremovably in the decoder. An alternative is made up of a circuit mounted on a base or connector such as a SIM module connector.

In a third form, the security module is integrated into an integrated circuit box also having another function, for example in a descrambling module of the decoder or in the microprocessor of the decoder.

In a fourth embodiment, the security module is not realised as a hardware, but its function is implemented only in software form. Given that in the four cases, the function is identical although the security level differs, we can talk about a security module regardless of the way in which its function is carried out or the form that this module may take.

During the decryption of a control message ECM, it is verified, in the security module, that the right or the key to access the concerned content is present. This right or this key can be managed by authorisation messages EMM (Entitlement Management Message) that load such a type of right or such a type of key into the security module. These authorisation messages can also contain software updates, corrective codes (patch), elements allowing the closing of a security breach or more generally, every information or element allowing the management of the security module or the associated decoder.

The diffusion of conditional access digital data is schematically divided into three modules. The first module is responsible for the encryption of the digital data by control words cw and the diffusion of this data.

The second module prepares the control messages ECM containing the control words cw, as well as the access conditions and diffuses them for the users.

The third module in turn prepares and transmits the authorisation messages EMM which are in particular responsible for defining the reception rights or transmitting the keys to the security modules connected to the receivers. These authorisation messages can also contain management elements of the multimedia unit.

While the two first modules are generally independent from the addressees, the third module manages the set of users and diffuses information to one user, a group of users or all the users.

In order to ensure that all the concerned users, or at least the majority of them have received the authorisation messages EMM which are intended for them, these messages are generally repeated numerous times in an identical way. These messages can be repeated cyclically according to a predefined frequency and during a time period depending on the importance of the message in particular.

Due to the repetition of the messages, ill-intentioned individuals can, by means of the analysis of several messages, obtain information that can be used to try to breach the security of the system. In particular, by analysing the number of messages received between two identical messages, it will be possible to deduce the number of messages contained in a cycle. The ill-intentioned individual can thus discover which quantity of messages must be analysed and which messages it is not necessary to analyse.

Furthermore, in certain present systems, it is possible to send back repeatedly the same message to a multimedia unit. The processing of this same message several times will also allow the deduction of useful data by a person attempting to break the security of the system.

The European Patent Application EP A 1 301 037 describes a process intended for the transmission of content in the encrypted form, in particular of Pay-TV content. According to this process, the content is encrypted with a first encryption key (S-key) before being sent. This first encryption key is itself encrypted with a second encryption key (key 2), then sent in the form of a control message ECM. The second encryption key is then encrypted with a key (key 1) specific to the concerned receiver, then superencrypted with a protection key (SSS). All of this is sent in a management message EMM. The protection key (SSS) is of a particular type. A content encrypted by such a key can be decrypted by several different keys. The knowledge of one of the keys allowing the decryption of the content however does not allow the deduction of another key. Likewise, the knowledge of one of the decryption keys does not allow the discovery of the encryption key or protection key.

In the process described in this document, the sending of the encrypted content and the control messages ECM is similar to the conventional prior art. The use of a protection key for the sending of management messages leads to a supplementary encryption level in relation to conventional systems. This superencryption does not allow, however, the concealing of the characteristics of a message sending cycle. In fact, it is sufficient for the validity duration of a protection key to be greater than the duration of a cycle to make it possible to locate the cyclical characteristic of message sending. In practice, when the protection key changes, it is necessary for the receivers to receive a corresponding decryption key. This change must be made sufficiently in advance so that each receiver disposes of the new key at the moment when the latter is used by the emitter. This generally takes longer than the message sending cycle of the management messages.

This invention intends to avoid the drawbacks of the processes of the prior art by carrying out a process in which it is impossible to obtain data relating to the working of the system from the analysis of the authorisation messages received by a multimedia unit.

DISCLOSURE OF THE INVENTION

The aim of the invention is achieved by a method for the transmission of management data to at least one multimedia unit or a group of multimedia units, characterised in that said management data is sent in the form of at least one authorisation message encrypted by means of at least one synchronisation key (SK), the sending of said at least one authorisation message being repeated cyclically and intended for said multimedia unit or said group of multimedia units, and in that the synchronisation key is modified at least during each cycle.

Thanks to the process of the invention, the messages received by a multimedia unit will no longer present periodicity, even if the emitted messages are repeated periodically. In this way, an ill-intentioned individual cannot determine if a periodicity exists and accordingly its value. Therefore, he can only limit his attack to a restricted number of messages.

According to the process of the invention, a message that has already been used cannot be re-used to be sent back to a multimedia unit. This also prevents information from being deduced by sending the same message several times and by analysing the result of the processing of this message.

Moreover, in the process of the invention, one or more supplementary encryption layers are added to existing encryption layers. Therefore, an increased security of the system is achieved.

SUMMARY DESCRIPTION OF THE DRAWINGS

This invention and its advantages will be better understood with reference to the enclosed Figures and to the detailed description of a particular embodiment, in which:

FIG. 1 shows a first embodiment of message sending according to the method of this invention;

FIGS. 2 and 3 illustrate two variants of messages used in the process of the invention.

MODES FOR CARRYING OUT THE INVENTION

Figure 4:
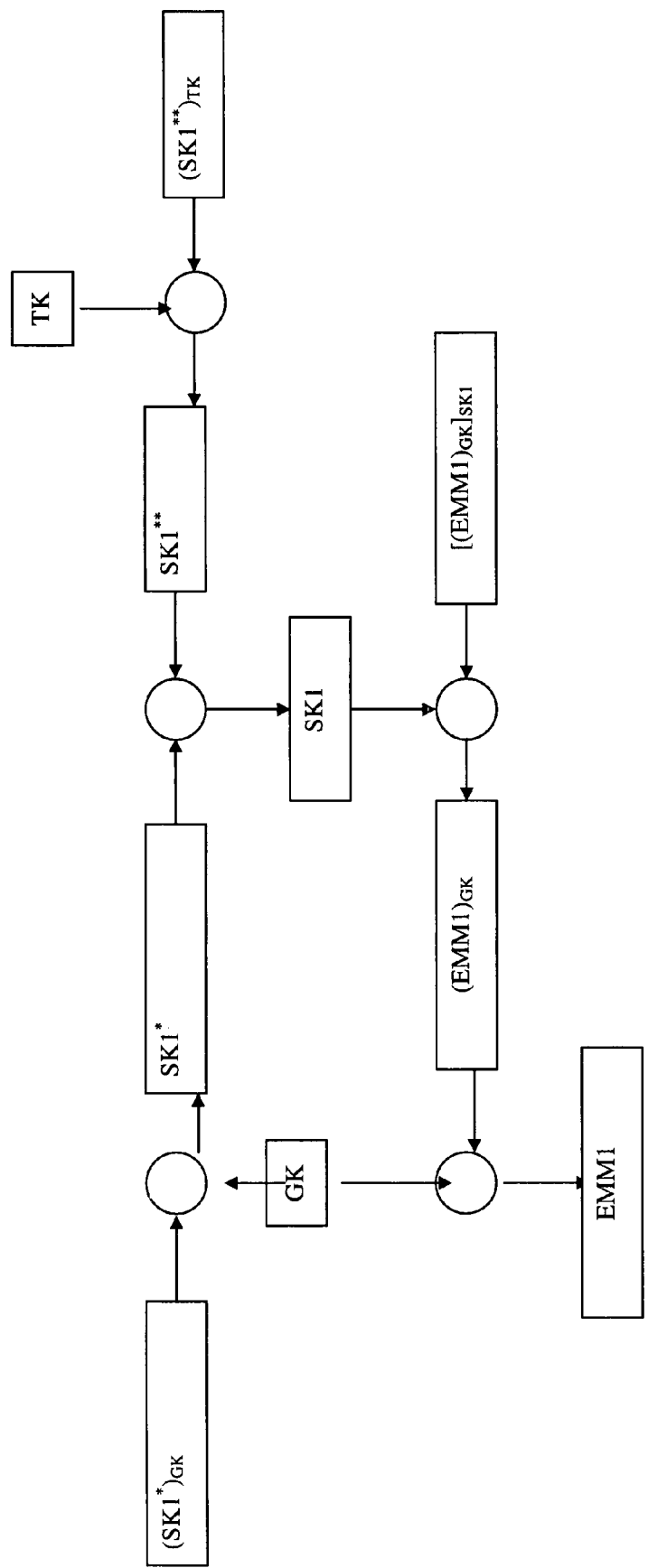
FIG. 4 represents schematically message decryption such as illustrated in FIG. 2.

Generally, as previously indicated, access to conditional access data is subject to the obtainment of access rights. These are transmitted to multimedia units in the form of authorisation messages EMM. These authorisation messages EMM can also contain different information allowing the management of the multimedia unit. This information can, for example, be a software patch or means to close a security breach. In order to ensure that all the users or practically all have correctly received the messages concerning them, these are repeated, generally numerous times, in a cyclical way.

In the embodiments illustrated in FIGS. 1 to 3, the authorisation messages EMM are encrypted by means of a key called authorisation key GK stored in the multimedia units. According to the invention, access to these authorisation messages also requires a key called a synchronisation key SK. It is to be noted that according to the type of authorisation message, namely global, shared or individual, the authorisation key can be common to all the multimedia units associated to a management centre, to a group of multimedia units or to only one.

In one of the possible embodiments, illustrated in particular in FIG. 1, this synchronisation key is sent in an authorisation message $EMM_{sync}$, called synchronisation message.

More particularly, FIG. 1 illustrates, in its upper part, a stream of authorisation messages such as used in the present invention, and in its lower part, a conventional control message ECM stream. The stream of authorisation messages includes three messages, called EMM1, EMM2 and EMM3, which are repeated cyclically.

The process of the invention as illustrated in this FIG. 1 works in the following way. A first synchronisation key SK1 is selected in a management centre. This synchronisation key is encrypted by means of an encryption key common to multimedia units that could be concerned with it, that is to say all the multimedia units connected to a subscription, a channel, a package of channels, a diffusion centre or a determined management centre, or those having acquired a particular right. The common key can be the key authorisation GK mentioned previously. The synchronisation key encrypted by the authorisation key is processed in order to form a message of the same type as the conventional authorisation messages EMM.

According to the embodiment illustrated in FIG. 1, each authorisation message EMM1, EMM2 and EMM3 is encrypted in a conventional way with the authorisation key GK. The first synchronisation key is then used to superencrypt the authorisation messages EMM1, EMM2, EMM3 previously encrypted with the authorisation key.

The process begins the cycle again following the sending of the authorisation messages EMM by selecting a second synchronisation key SK2, then by superencrypting the authorisation messages EMM1, EMM2 and EMM3, previously encrypted with the authorisation key, by means of this second synchronisation key. The process is carried out likewise for each authorisation message cycle.

A stream of authorisation messages is then formed by placing the synchronisation key at the beginning of each cycle, followed by the authorisation messages EMM superencrypted with this synchronisation key.

As the synchronisation key is modified in each synchronisation message, the same initial authorisation message will lead to a different message in the course of each cycle. Therefore, a person intercepting the authorisation messages with a view to analysing them will not be able to deduce the information related to periodicity, to the number of different messages per cycle or other information which could be used with a view to compromising the security of the system.

The control messages ECM, schematically represented in the lower part of FIG. 1, are transmitted conventionally.

In the above description, it is indicated that the synchronisation messages $EMM_{sync}$ are sent at the beginning of each sending cycle of authorisation messages EMM. According to one alternative, the synchronisation messages can be sent not only at the beginning of the cycle, but also at any moment of the latter. In this case, as it is necessary to dispose of the synchronisation key SK to be able to access authorisation messages EMM, these messages can be stored while waiting to receive the corresponding synchronisation message and having extracted the synchronisation key from said message. Once this synchronisation key is available, the authorisation messages can be extracted from the memory and decrypted. The remainder of the process is then carried out as previously indicated.

According to another variant, the authorisation messages are not sent cyclically, or only a part of them is sent in this way. In this case, the synchronisation key is not modified at the beginning of each cycle, but can be modified at any moment. The key could be modified for example for each authorisation message EMM, after a predefined number of messages, after a certain time or according to any other criterion. It should be noted that if the synchronisation key is modified after a predefined number of authorisation messages, this number is lower than the number of messages of a cycle. In a similar way, if the synchronisation key is modified after a predefined time, this time is shorter than the duration of a cycle. It is possible to provide a piece of information to indicate the change of synchronisation key, in such a way that the correct key is used according to the received messages. According to one variant, each synchronisation key SK received by the multimedia unit invalidates the previous synchronisation key. The order of the synchronisation key change messages must of course be respected in relation to the authorisation messages EMM.

According to a supplementary variant, the synchronisation keys can be stored in the security module either by sending them previously in the form of a set of keys, or by introducing them at the moment of the personalisation of the security module.

In the example described with reference to FIG. 1, the EMM authorisation messages are first encrypted with the authorisation key GK before being encrypted with the synchronisation key SK. It is however also possible to invert the encryption order, that is to say to encrypt the authorisation messages first with the synchronisation key SK, then with the authorisation key GK. Another possibility consists in encrypting the authorisation messages only with the synchronisation key SK, without using the authorisation key GK.

A further possibility consists in adding an authentication step of the unit or multimedia units to which the messages are destined. This step can, for example, consist in encrypting a message with an asymmetrical key in such a way that an individual not possessing the decryption asymmetrical key corresponding to the encryption asymmetrical key will not be capable of decryption the message. This has essentially the aim of preventing an ill-intentioned individual from intercepting a message, decrypting it and replacing it with another message. The encryption order of the messages with the synchronisation key SK, possibly with the authorisation key GK and possibly with the asymmetrical key can be selected freely, as long as this order is known by the decryption.

It is noted that it is possible to have authorisation messages sent cyclically and to change the synchronisation keys in a non-cyclical way or according to an asynchronous cycle.

FIG. 2 shows an embodiment in which the synchronisation key is not entirely contained in a synchronisation message, but must be formed from several messages.

In this case, a first part of the synchronisation key, called SK1* is selected in the management centre. This first part is encrypted by means of the authorisation key GK and is formatted as previously in order to form a message of the authorisation message EMM type.

A second part of the synchronisation key, called SK1** is also selected in the management centre. This second part is encrypted by means of the transmission key TK, used for the encryption of the control messages ECM. The result in turn is formatted so as to form a message of the control message ECM type.

The synchronisation key SK is formed by the association of two parts of the synchronisation key. This association can be made by concatenation, by means of a mathematical function such as an exclusive OR for example, by encrypting one part of the key with the other part or by all other similar means.

The streams of authorisation EMM and control ECM messages are sent in a conventional way. It is however necessary to dispose of both streams to extract both parts of the synchronisation keys and also to be able to access the authorisation messages EMM. These streams must however be synchronised in order to be able to generate the correct synchronisation key SK.

In the embodiment illustrated in FIG. 2, the synchronisation key is made up of two parts, each part being in a message of a different type. According to one variant, it is possible to form the key from a larger number of parts. Moreover, the parts could all be in the same type of message or in different types of messages, these types not being limited to authorisation messages EMM and control messages ECM. In fact, service messages SI or any other possible types could be appropriate. It is also possible to create a particular format for the sending of the synchronisation key. Of course, the essential factor is that the receiver is capable of processing the received messages and of extracting the elements allowing the generation of the synchronisation key.

According to another variant of FIG. 2, it is possible to provide different streams of control messages ECM, in which each stream is associated to a particular set of synchronisation keys and in which each stream corresponds for example to a different service.

In this case, it is possible to send specific authorisation messages to these services, this in addition to the conventional addressing of the authorisation messages.

FIG. 3 shows a particular case in which the synchronisation keys are sent in a specific message stream, different from the authorisation EMM and control messages ECM. In the embodiment illustrated in FIG. 3, the authorisation messages EMM1, EMM2 and EMM3 are encrypted only by the synchronisation key, without previous encryption by the authorisation key. According to one variant, they could however also be encrypted previously or subsequently by the authorisation key GK.

As illustrated by this Figure, the synchronisation keys are encrypted by means of the authorisation key. In this case, it is first necessary to decrypt a synchronisation message before being able to access corresponding authorisation messages.

According to a variant not shown, it is also possible to encrypt the EMM authorisation messages not by means of the synchronisation keys, but rather by means of the transmission key TK. These control messages could also be encrypted, in addition to encryption by synchronisation keys, by the transmission key TK, the encryption order, in the case of the use of the synchronisation and transmission keys being selected in the system. These control messages could be encrypted only by synchronisation keys, without the use of the transmission key. It should be noted that message types other than control messages ECM or authorisation messages EMM could also be used.

According to one alternative of the invention, the synchronisation key cannot be contained as such in the synchronisation message $EMM_{sync}$. This message instead contains the elements allowing the determination of this key.

One way to implement this variant consists, for example, in forming the synchronisation message with a time information and a provisional key. The synchronisation key can be formed in this case by a key hashing function using the time information as an entry and the provisional key as a hashing key. This execution method is interesting as it contains a time information that can be used in the multimedia unit for permanently updating and controlling the validity of a message received. In fact, this time information allows the filtering of the messages which have already been received and prevents an ill-intentioned individual from sending back the same messages several times with the aim of accessing data without authorisation or from deducing information that will allow a better comprehension of the mechanisms of the system.

This function known under the name "anti-replay", that prevents the returning of messages that have already been used, can be executed on the basis of a time information, that is to say in particular a date and/or a time as indicated above or on the basis of a counter for example. In this case, the messages contain a value that is stored when the message has been decrypted. If a further message contains the same value, this message is considered as an old message already used. The message can simply be eliminated or countermeasures can be taken, as far as prohibiting access to the content. It is clear that, for the management of this function, the multimedia unit must be capable of managing the time information or the counter in order to prevent the "sending back" of this time information.

The time information described above could prove useful when a synchronisation message containing a specific synchronisation key is sent several times. This repeated sending can be useful or even necessary to guarantee the good quality of the service. In this case, it could be interesting to encrypt the synchronisation messages, before each transmission, by means of the time information so that it will not be possible to extract these synchronisation messages from the stream received. This variant also presents the advantage of reducing the number of synchronisation keys to be generated, the generation of which can be expensive in terms of time and/or resources.

The present invention covers the variants independently from each other, as described above, but also covers the combinations of these variants. As an example, it is possible to send the elements allowing the formation of the synchronisation key in several different messages, these messages being of a different type. For example, the synchronisation key can be formed from a date contained in an authorisation message EMM and from a provisional key contained in a service message SI and from a supplementary item of information contained in a control message ECM. In this case, it will be necessary to obtain each of the three pieces of information to gain access to the authorisation messages EMM.

According to a variant of the invention, it is possible to use not one single synchronisation key, but several. According to a particular embodiment, the authorisation messages EMM are encrypted by more than one synchronisation key, for example two keys. In this case, it is necessary to dispose of all the synchronisation keys to access an encrypted content. These synchronisation keys can have a different periodicity and are completely independent from each other.

In the above description, it is not specified if the synchronisation keys are of the symmetrical type or not. In fact, it is possible to use a symmetrical key as well as an asymmetrical key.

In the embodiment described above, in which several keys are used to encrypt the same authorisation message EMM, it is possible to use a symmetrical key and an asymmetrical key, these keys being able to be changed according to different periodicities.

According to one variant of the invention, the synchronisation key is indispensable for filtering the authorisation messages EMM.

In a well known method, certain authorisation messages contain identifiers or identifier areas corresponding to multimedia units to which the messages are destined. In the present variant of the invention, these identifiers are not integrated in plaintext in the authorisation messages EMM, but rather are encrypted by means of the synchronisation key.

These identifiers, or identifier areas, are reconstructed by the multimedia unit, by the decoder or by the security module. More particularly, the filtering identifier can be reconstructed by the decoder itself which then filters the messages. It can also be reconstructed by the security module which then transmits it to the decoder to filter these messages. A combination of two of the variants above is also possible.

If the identifier of the multimedia unit corresponds to an identifier contained in the authorisation message, this is processed in a conventional way. Otherwise, if this identifier does not correspond, a filter blocks or eliminates the message. This filter can be placed in the decoder or in the security module.

When a multimedia unit does not dispose of the synchronisation key, the filter eliminates the message so that the multimedia unit cannot acquire a new right without the synchronisation key.

It should be noted that in the examples illustrated in the Figures, the synchronisation keys are encrypted by keys connected to control messages ECM or to authorisation messages EMM. In general, it is possible to use completely independent keys, as long as they are known or they can be determined by the multimedia unit that is responsible for the decryption of the messages containing these synchronisation keys.

It is also to be noted that these keys serving to encrypt the synchronisation messages are not necessarily global, but can be individual or shared, according to criteria such as services, groups of identifiers or others.

FIG. 4 shows schematically the decryption of the authorisation messages EMM in the case of the sending of messages such as illustrated in FIG. 2.

The multimedia unit receives the stream of authorisation messages EMM and the stream of control messages ECM. From the stream of authorisation messages, the synchronisation message $EMM_{sync}$ can be extracted which corresponds to the first part SK1* of the synchronisation key, encrypted with the authorisation key GK. Since this multimedia unit disposes of the authorisation key, it can determine the first part of the synchronisation key SK1*.

From the stream of control messages, the multimedia unit can extract the message containing the second part of the synchronisation key SK1 encrypted by the transmission key TK. Since the multimedia unit also disposes of the transmission key TK, it is capable of determining the second part of the synchronisation key SK1. From these two parts, by applying the required operation, the multimedia unit can form the synchronisation key SK1.

The authorisation messages received by the multimedia unit are then decrypted using this synchronisation key SK1. These authorisation messages can thus be obtained in plaintext. These are then used in a conventional way.

The same process is carried out with a second synchronisation key during the following cycle. Decryption can be carried out in the decoder or in the security module associated to this decoder.

This invention thus offers improved security in relation to the systems of the prior art and conceals information that could be useful to ill-intentioned individuals.

The invention claimed is:

1. A method, comprising:
    transmitting management data to at least one multimedia unit or a group of multimedia units in a form of at least three authorization messages, at least two of said at least three authorization messages including an identical content and at least two of said at least three authorization messages including non-identical contents, said at least three authorization messages being encrypted by at least one synchronization key,
    cyclically repeating the transmission of said at least three authorization messages such that the transmission of two authorization messages including the identical content is separated by the transmission of at least one authorization message including the non-identical content, said at least three authorization messages being intended for said multimedia unit or said group of multimedia units, and
    modifying the at least one synchronization key at least between two consecutive cycles.

2. The method according to claim 1, wherein said management data includes at least one identifier of the at least one synchronization key.

3. The method according to claim 1, wherein said management data includes at least the at least one synchronization key.

4. The method according to claim 1, wherein said management data is at least one of access rights to data, keys, an executable code and management data of the multimedia unit.

5. The method according to claim 1, wherein the at least one synchronization key is sent at the beginning of a cycle.

6. The method according to claim 1, wherein the at least three authorization messages are encrypted only with said at least one synchronization key.

7. The method according to claim 1, wherein the at least three authorization messages are encrypted with authorization key and with said at least one synchronization key.

8. The method according to claim 7, wherein a frequency of modification of the authorization key is different from a frequency of modification of the at least one synchronization key.

9. The method according to claim 7, wherein the encryption of the a least three authorization messages is carried out by first using the authorization key and then by using the at least one synchronization key.

10. The method according to claim 7, wherein the encryption of the at least three authorization messages is carried out by first using the at least one synchronization key and then using the authorization key.

11. The method according to claim 1, wherein said at least one synchronization key is modified after the encryption of a desired number of authorization messages, the desired number being lower than or equal to a number of authorization messages forming a cycle.

12. The method according to claim 1, wherein said at least one synchronization key is modified after a desired usage duration, the desired usage duration being lower than or equal to the duration of a cycle.

13. The method according to claim 1, wherein said at least one synchronization key is made up of several parts of the synchronization key and said key parts are transmitted to the concerned multimedia units in several different messages.

14. The method according to claim 13, wherein said different messages including a part of the synchronization key are of at least two different types of messages.

15. The method according to claim 1, wherein said authorization message contains a time information.

16. The method according to claim 1, wherein said authorization message contains a unique value different for two different messages.

17. The method according to claim 1, wherein at least two synchronization keys are used simultaneously.

18. The method according to claim 17, wherein the at least two synchronization keys have a different validity duration.

19. The method according to claim 1, wherein said at least one multimedia unit includes an identifier and at least one broadcast message includes at least one identifier that indicates for which multimedia unit this message is intended, wherein said identifier contained in the message is encrypted by the synchronization key.

* * * * *